(12) United States Patent
Sannomiya et al.

(10) Patent No.: US 12,117,643 B2
(45) Date of Patent: *Oct. 15, 2024

(54) INPUT DEVICE AND CONTROL SYSTEM

(71) Applicant: Sony Interactive Entertainment Inc., Tokyo (JP)

(72) Inventors: Ryu Sannomiya, Tokyo (JP); Takeshi Igarashi, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/546,851

(22) PCT Filed: Feb. 21, 2022

(86) PCT No.: PCT/JP2022/006870
§ 371 (c)(1),
(2) Date: Aug. 17, 2023

(87) PCT Pub. No.: WO2022/185965
PCT Pub. Date: Sep. 9, 2022

(65) Prior Publication Data

US 2024/0134110 A1   Apr. 25, 2024
US 2024/0230980 A9   Jul. 11, 2024

(30) Foreign Application Priority Data

Mar. 2, 2021   (JP) ................. 2021-032863

(51) Int. Cl.
*F21V 8/00*   (2006.01)
*A63F 13/213*   (2014.01)
(Continued)

(52) U.S. Cl.
CPC ......... *G02B 6/0068* (2013.01); *G02B 6/0083* (2013.01); *G06F 3/02* (2013.01); *A63F 13/213* (2014.09); *A63F 13/24* (2014.09)

(58) Field of Classification Search
CPC ....... G02B 6/0068; G02B 6/0083; G06F 3/02; A63F 13/213; A63F 13/24
See application file for complete search history.

(56) References Cited

U.S. PATENT DOCUMENTS 9,690,392 B2   6/2017   Igarashi
10,010,789 B2   7/2018   Koizumi
(Continued)

FOREIGN PATENT DOCUMENTS

JP   2008276636 A   11/2008
JP   2017000760 A   1/2017
(Continued)

OTHER PUBLICATIONS

International Search Report for corresponding PCT Application No. PCT/JP2022/006870, 4 pages, dated May 10, 2022.

*Primary Examiner* — Mary Ellen Bowman
(74) *Attorney, Agent, or Firm* — Matthew B. Dernier, Esq.

(57) ABSTRACT

The number of light sources that emit light according to identification information regarding an input device is reduced. An input device (10) includes a first light source (S1), a second light source (S2), a first illumination part (E1) that is illuminated by light from the first light source (S1) in order to indicate identification information allocated to the input device, two second illumination parts (E2) that are placed at positions different from a position of the first illumination part (E1) and that are illuminated by light from the second light source in order to indicate the identification information, and a light guide member (50) that guides the light from the second light source (E2) to the two second illumination parts (E2).

18 Claims, 13 Drawing Sheets

(51) Int. Cl.
*A63F 13/24* (2014.01)
*G06F 3/02* (2006.01)

(56) References Cited

U.S. PATENT DOCUMENTS

| | | | |
|---|---|---|---|
| 11,199,902 B2 | 12/2021 | Uchida | |
| 11,534,682 B2* | 12/2022 | Kobayashi | G06F 3/033 |
| 11,878,235 B2* | 1/2024 | Kobayashi | A63F 13/26 |
| 2009/0093305 A1* | 4/2009 | Okamoto | A63F 13/45 |
| | | | 463/43 |
| 2015/0193017 A1 | 7/2015 | Igarashi | |
| 2016/0361641 A1 | 12/2016 | Koizumi | |
| 2020/0301508 A1 | 9/2020 | Uchida | |

FOREIGN PATENT DOCUMENTS

| | | |
|---|---|---|
| JP | 2020154452 A | 9/2020 |
| WO | 2014061362 A1 | 4/2014 |

\* cited by examiner

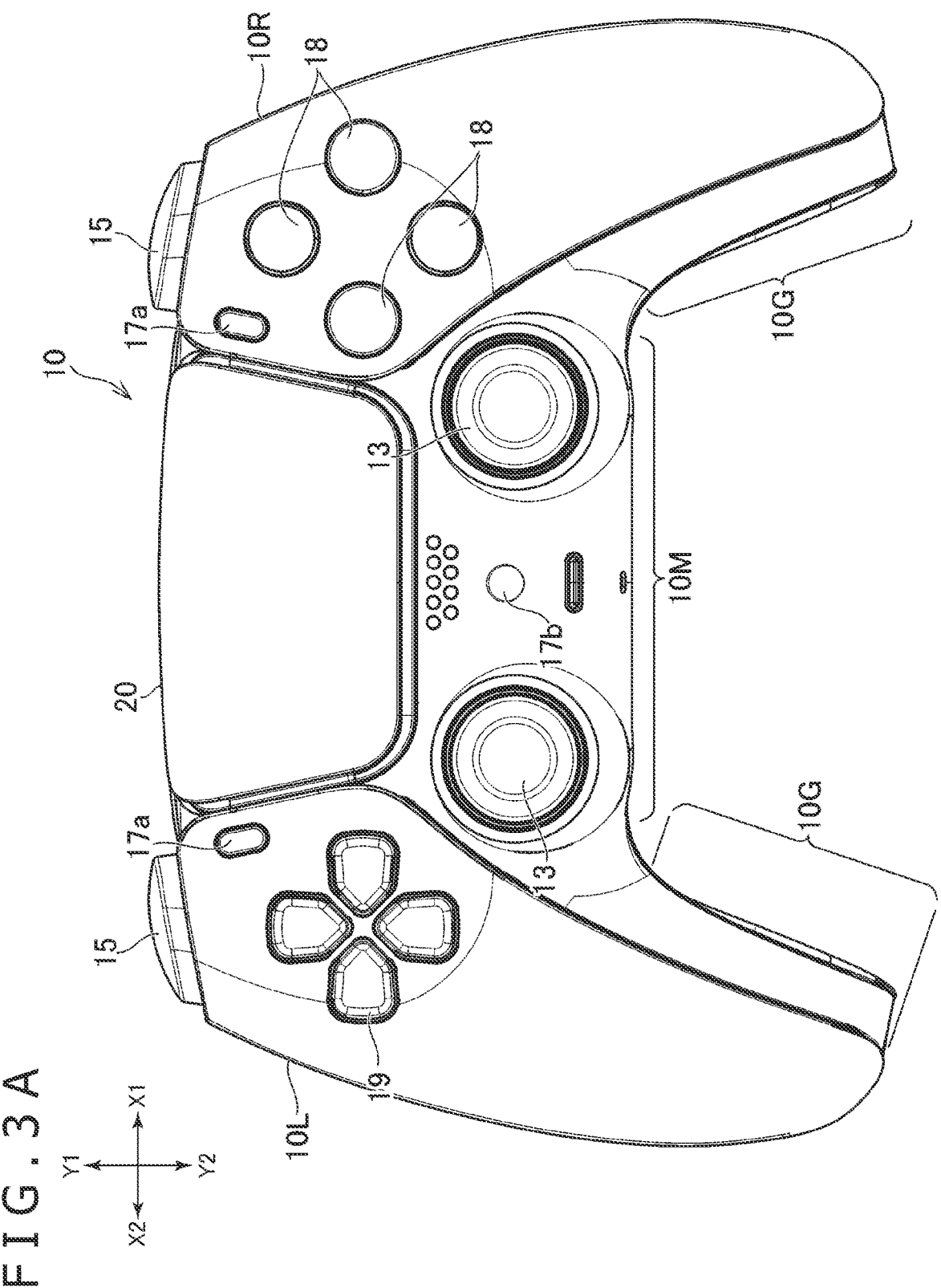

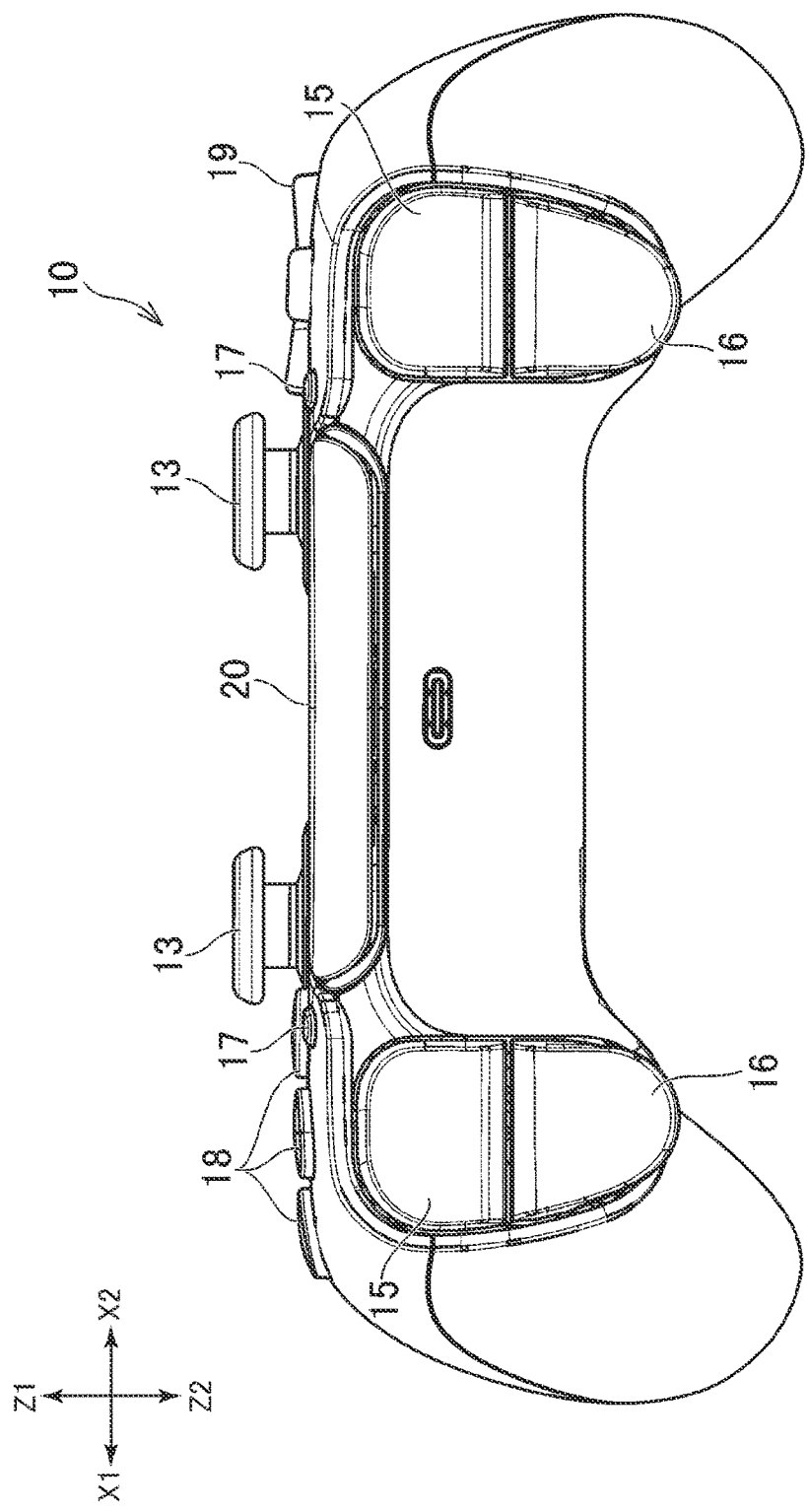

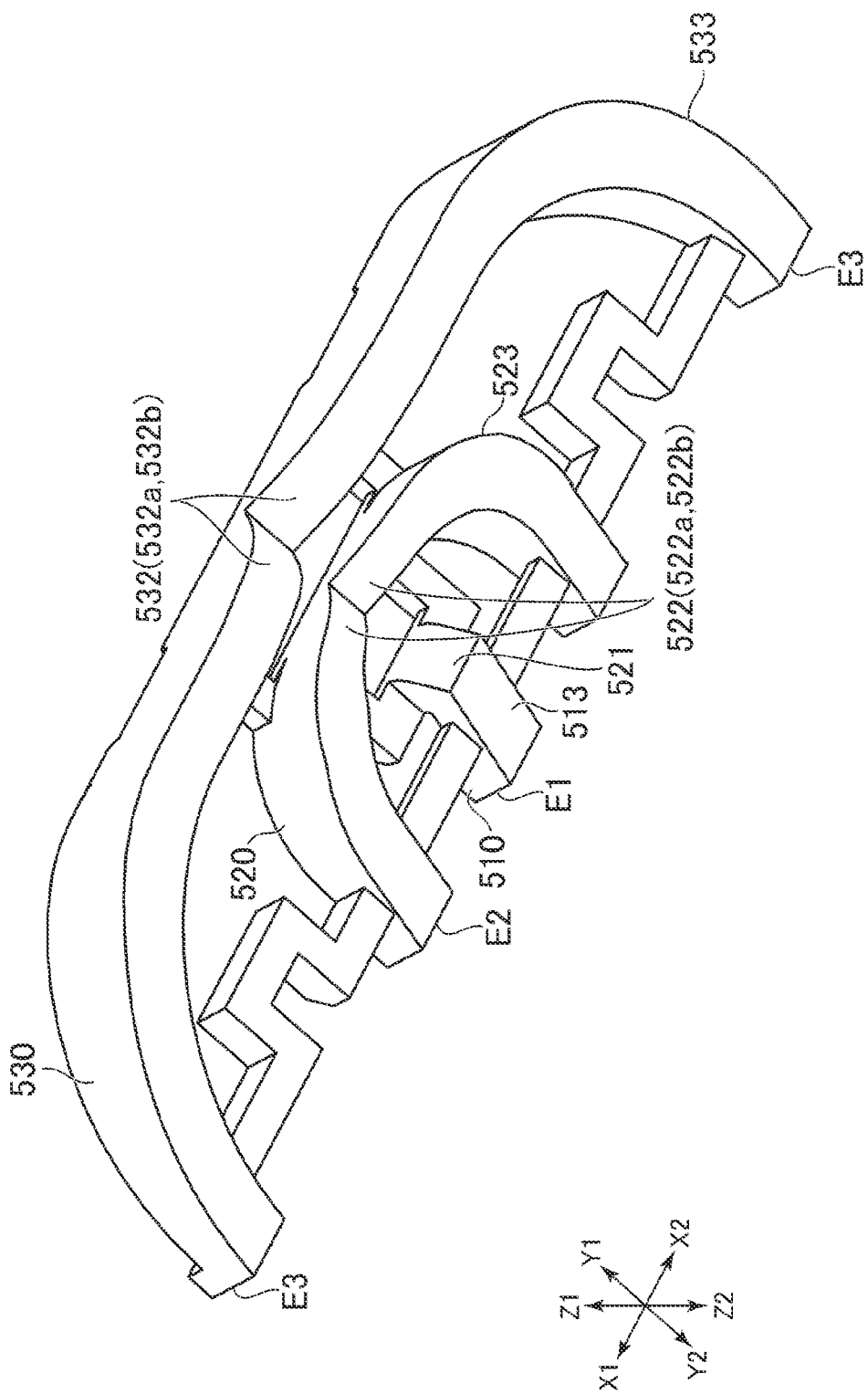
F I G . 6 B

INPUT DEVICE AND CONTROL SYSTEM

TECHNICAL FIELD

The present disclosure relates to an input device and a control system for use in operation of a game, for example.

BACKGROUND ART

PTL 1 discloses an input device for use in operation of a game apparatus. This input device is equipped with operation members including input buttons, direction keys, and an operation stick, for example. A game apparatus may establish connection with a plurality (e.g., three or more) of such input devices, in some cases. In such a case, identification information unique to each input device is allocated to a corresponding input device in order to identify one from another.

CITATION LIST PATENT LITERATURE

[PTL 1] PCT Patent Publication No. WO2014/061362

Summary Technical Problem

In order to indicate identification information allocated to an input device, a predetermined position in the input device may be illuminated according to the identification information, in some cases. In this case, it is preferable that the number of light sources that are provided in the input device be minimized.

An object of the present disclosure is to provide an input device and a control system that enable a reduction in the number of light sources which are provided to emit light according to identification information.

Solution to Problem

One example of an input device that is proposed by the present disclosure is an input device to which unique identification information is allocated. The input device includes a first light source, a second light source, a first illumination part that is illuminated by light from the first light source in order to indicate the identification information, two second illumination parts that are placed at positions different from a position of the first illumination part and that are illuminated by light from the second light source in order to indicate the identification information, and a light guide member including a second light guide part that guides the light from the second light source to the two second illumination parts. According to the input device, the number of light sources can be reduced compared to a case where three light sources are provided for the respective three illumination parts.

In addition, one example of a control system that is proposed by the present disclosure includes an input device and a controller that allocates unique identification information to the input device. The input device includes a first light source, a second light source, a first illumination part that is illuminated by light from the first light source in order to indicate the identification information, two second illumination parts that are placed at positions different from a position of the first illumination part and that are illuminated by light from the second light source in order to indicate the identification information, and a light guide member including a second light guide part that guides the light from the second light source to the two second illumination parts, and the controller turns on one of or both the first light source and the second light source in such a manner that one of or both the first illumination part and the two second illumination parts are illuminated according to the identification information allocated to the input device. According to the control system, the number of light sources that are provided in the input device can be reduced compared to a case where three light sources are provided for the respective three illumination parts in the input device.

BRIEF DESCRIPTION OF DRAWINGS

FIG. 3A is a plan view of one example of the input device.

FIG. 3B is a plan view of one example of the input device.

FIG. 6B is an exploded perspective view of one example of the light guide member.

DESCRIPTION OF EMBODIMENT

Figure 1:
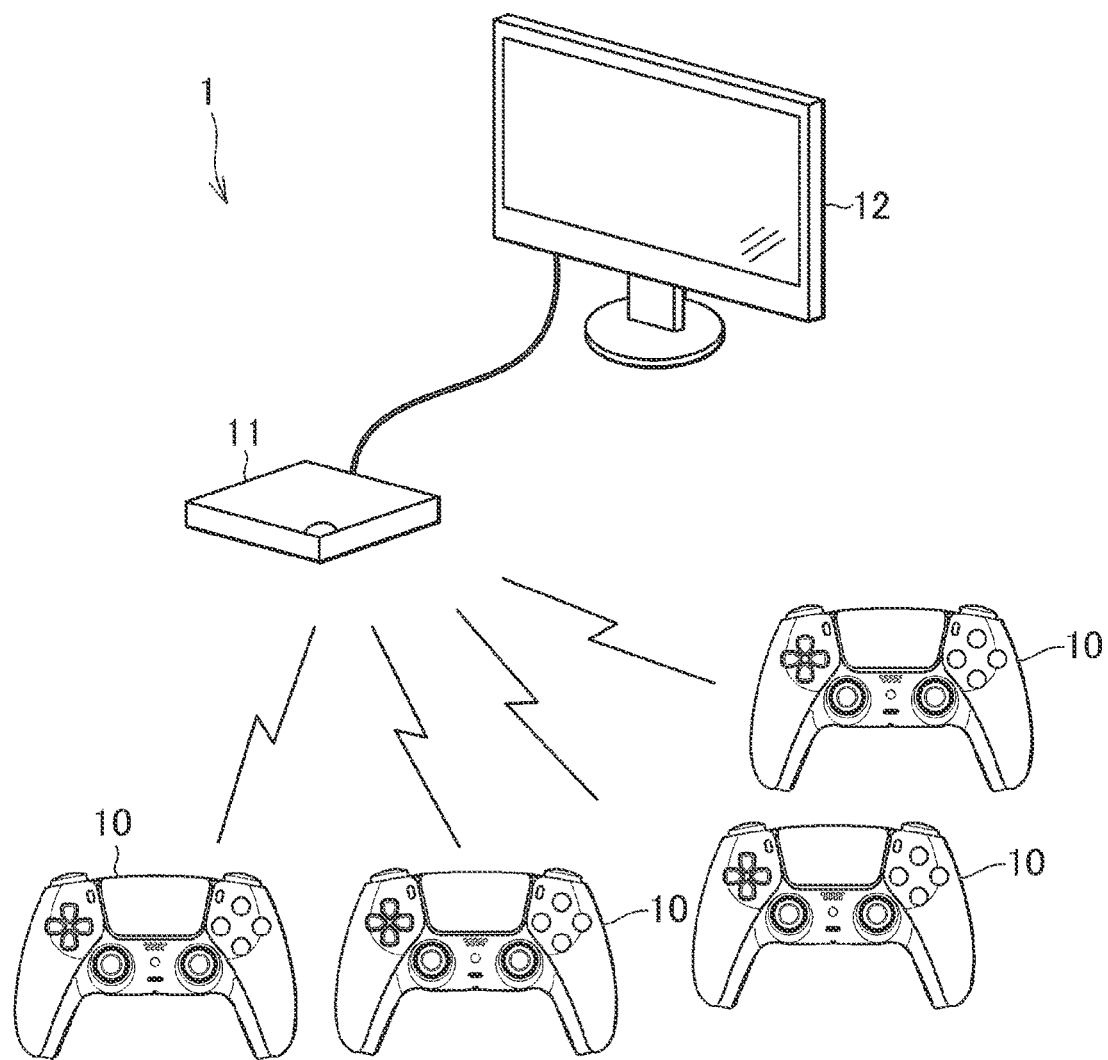
FIG. 1 is a diagram depicting one example of a control system that is proposed by the present disclosure.

Hereinafter, an embodiment of the present disclosure will be explained with reference to the drawings. FIG. 1 is a diagram depicting one example of the general configuration of a control system 1 which is proposed by the present disclosure. As depicted in FIG. 1, the control system 1 includes an information processing apparatus 11 and a display apparatus 12. The control system 1 further includes a plurality of (four in FIG. 1) input devices 10.

[Configuration of Controller]

The information processing apparatus 11 is a computer such as a game apparatus, for example. The display apparatus 12 is a liquid crystal display or an organic EL (Electroluminescent) display, for example. The display apparatus 12 displays a video indicated by a video signal that is outputted from the information processing apparatus 11. It is to be noted that the information processing apparatus 11 and the display apparatus 12 may be constructed as a display-equipped integrated apparatus such as a smartphone or a tablet. In one example, the information processing apparatus 11 is connected to a network such as the Internet and receives data transmitted from a server apparatus over the network. Thus the information processing apparatus 11 relays the data from the server apparatus. The information processing apparatus 11 may output a result of processing (e.g., game processing) executed by the server, to the display apparatus 12, for example. Alternatively, the information processing apparatus 11 may be the server apparatus that is connected over the network.

Figure 2A:
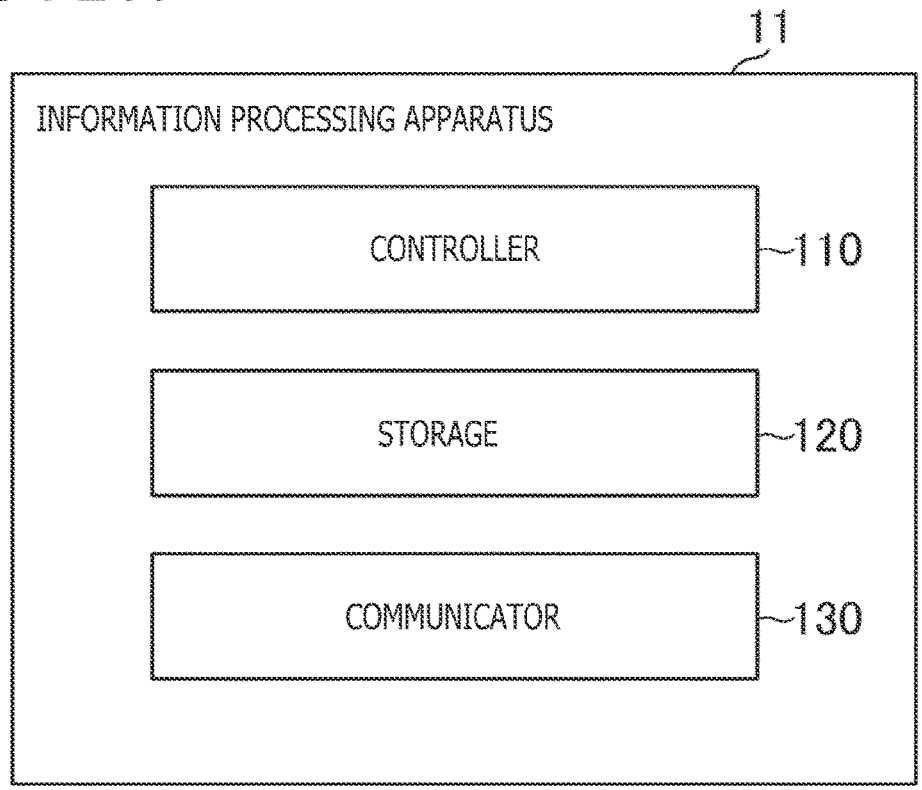
FIG. 2A is a diagram depicting one configuration example of an information processing apparatus.

FIG. 2A is a diagram depicting one configuration example of the information processing apparatus 11. As depicted in FIG. 2A, the information processing apparatus 11 includes a controller 110, a storage 120, a communicator 130, etc. The controller 110 includes a CPU (Central Processing Unit) and a GPU (Graphics Processing Unit), for example. The storage 120 is, for example, a hard disk drive or a storage element such as a ROM (Read Only Memory) or a RAM (Random Access Memory). The CPU operates according to a program installed in the storage 120. The GPU renders an image on a frame buffer on the basis of a graphics command or data supplied from the CPU. The CPU generates a video and a sound by executing a game program stored in the storage or another storage, for example. The communicator 130 is a communication interface such as a network board, a wireless LAN (Local Area Network) module, or a Bluetooth (registered trademark) module. The communicator 130 performs wired or wireless data communication with the plurality of input devices 10 individually.

Figure 2B:
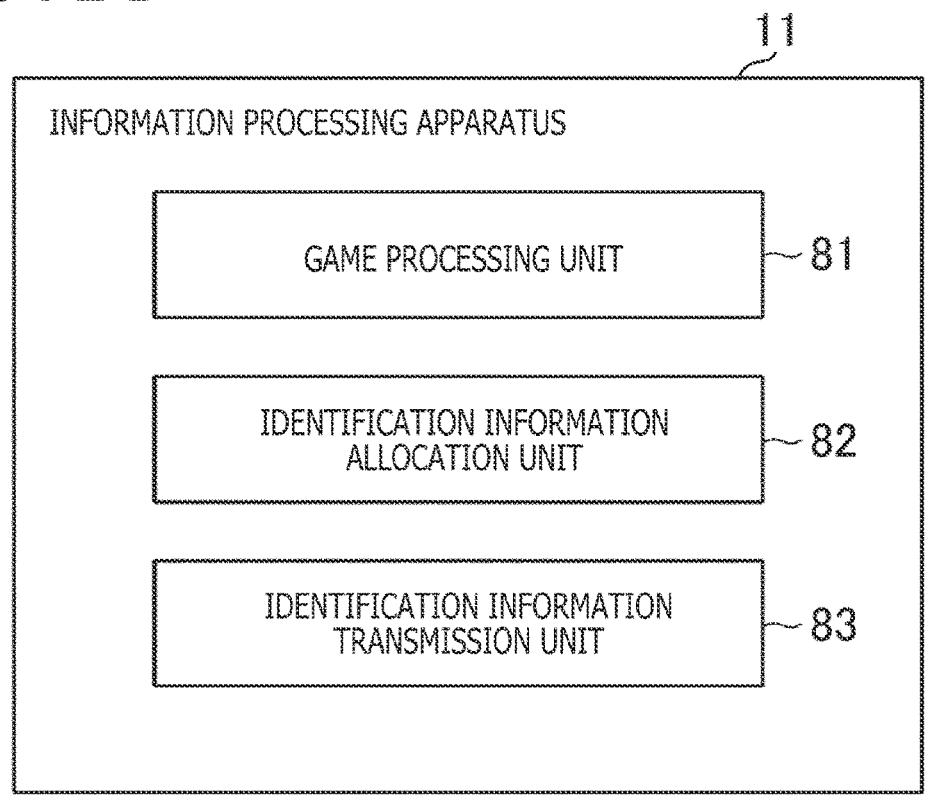
FIG. 2B is a block diagram depicting one example of functions that are implemented by the information processing apparatus.

FIG. 2B is a block diagram depicting one example of the functions that are implemented by the information processing apparatus 11. For example, the information processing apparatus 11 includes, as functions, a game processing unit 81, an identification information allocation unit 82, and an identification information transmission unit 83, as depicted in FIG. 2B. The game processing unit 81 executes a game program stored in the storage 120 or another storage, and generates a video and a sound as a result of the execution. The communicator 130 outputs a signal indicating the generated video and sound, to the display apparatus 12 and a loudspeaker (not depicted). The game processing unit 81 may be implemented by the controller 110 of the information processing apparatus 11. In a case where the information processing apparatus 11 is configured to output (relay) a game processing result transmitted from the server apparatus, the game processing unit 81 may be implemented by a controller such as a CPU included in the server apparatus.

The identification information allocation unit 82 allocates unique identification information to each input device 10. The identification information allocation unit 82 allocates, as the identification information, any one of a first number, a second number, a third number, and a fourth number, for example, to each input device 10. The identification information allocation unit 82 may be implemented by the controller 110 of the information processing apparatus 11. The identification information transmission unit 83 transmits the identification information allocated to each input device 10 by the identification information setting unit 82, to the corresponding input device 10. The identification information transmission unit 83 may be implemented by the communicator 130 of the information processing apparatus 11.

As previously explained, the plurality of input devices 10 are connected to the information processing apparatus 11 in a wired or wireless manner. In the present embodiment, the identification information allocation unit 82 allocates, as the identification information, a number that is unique to each input device 10, to the corresponding input device 10. For example, in a case where three input devices 10 are connected to the information processing apparatus 11, the identification information allocation unit 82 allocates a first number (more specifically, "1") to one of the input devices 10, allocates a second number (more specifically, "2") to another one of the input devices 10, and allocates a third number (more specifically, "3") to the remaining input device 10. In addition, in a case where four input devices 10 are connected to the information processing apparatus 11, the identification information allocation unit 82 further allocates a fourth number (more specifically, "4") to the additional input device 10. It is to be noted that, in a case where five input devices 10 are connected to the information processing apparatus 11, the identification information allocation unit 82 may further allocate a fifth number (more specifically, "5") to the last input device 10. Moreover, according to addition or deletion of input devices 10 that are connected to the information processing apparatus 11, the identification information allocation unit 82 may change the identification information which is, for example, a number to be allocated to each of the input devices 10.

[Configuration of Input Device]

Figure 2C:
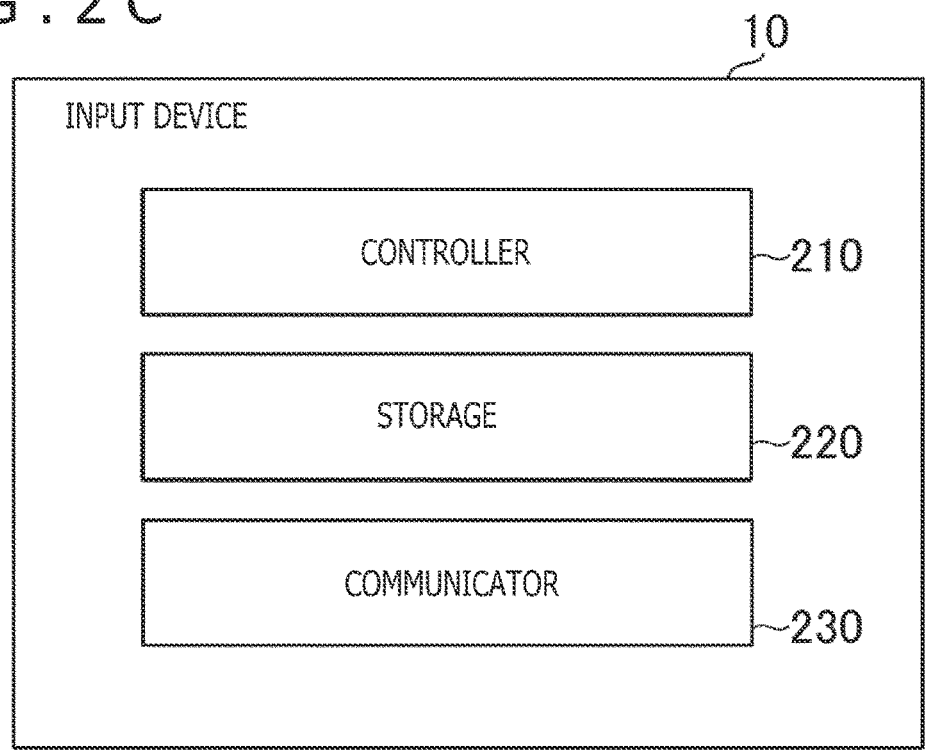
FIG. 2C is a diagram depicting one configuration example of an input device.

FIG. 2C is a diagram depicting one configuration example of the input device 10. The input device 10 is used by a user to perform an input operation to the information processing apparatus 11. As depicted in FIG. 2C, the input device 10 includes a controller 210, a storage 220, a communicator 230, etc. The controller 210 is, for example, a driving circuit such as a DSP (Digital Signal Processor) and is mounted on a circuit board 60 (see FIG. 5), which will be explained later, for example. The storage 220 is, for example, a storage element such as a memory. The communicator 230 is, for example, a communication interface such as a wireless LAN module or a Bluetooth (registered trademark) module. The communicator 230 performs wired or wireless data communication with the communicator 130 of the information processing apparatus 11.

Figure 2D:
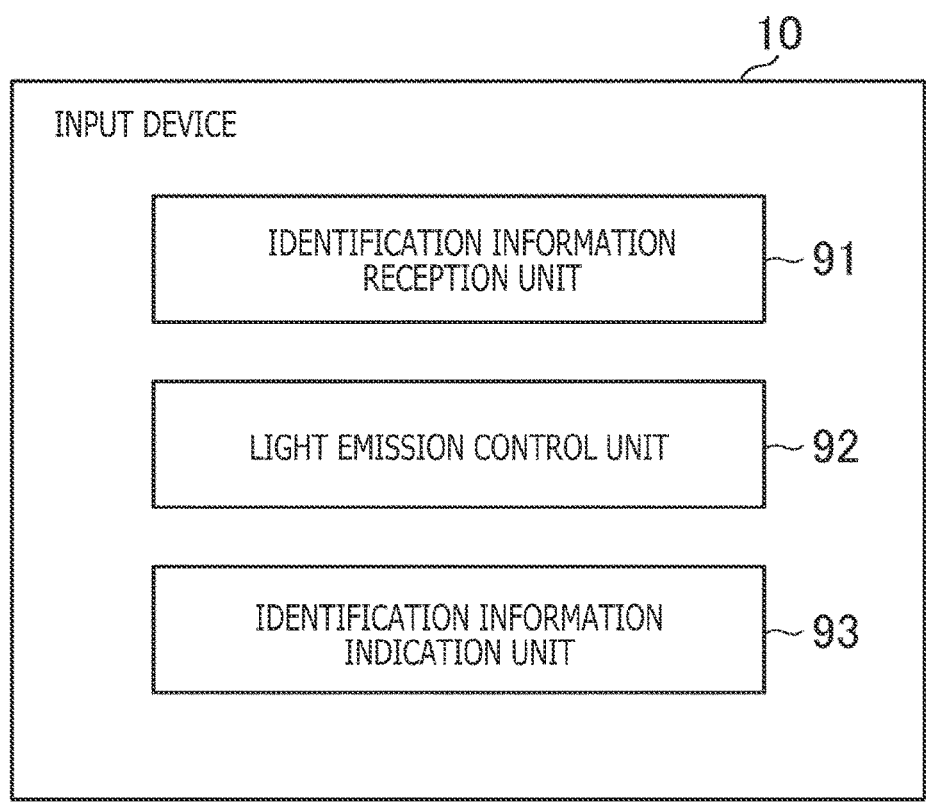
FIG. 2D is a block diagram depicting one example of functions that are implemented by the input device.

FIG. 2D is a block diagram depicting one example of functions that are implemented by the input device 10. For example, the input device 10 includes, as functions, an identification information reception unit 91, a light emission control unit 92, and an identification information indication unit 93, as depicted in FIG. 2D. The identification information reception unit 91 receives identification information, e.g., a number, that has been allocated by the identification information allocation unit 82 of the information processing apparatus 11 and transmitted by the identification information transmission unit 83. The identification information reception unit 91 may be implemented by the communicator 230 of the input device 10.

The light emission control unit 92 controls light sources S1 to S3 (see FIG. 5), which will be explained later, according to the identification information, e.g., a number, received by the identification information reception unit 91. The light emission control unit 92 may be implemented by the controller 210 (driving circuit) of the input device 10.

The identification information indication unit 93 indicates the identification information allocated to the input device 10, in such a manner that a user can visually recognize the information. In the present embodiment, the identification information indication unit 93 is implemented by illumination parts E1 to E3 and a light diffusion member 30 (see FIG. 5), which will be explained later.

FIG. 3A is a plan view of the input device 10. FIG. 3B is a front view of the input device 10. In the following explanation, X1, X2, Y1, and Y2 in FIG. 3A represent the right direction, the left direction, the front direction, and the rear direction, respectively, and Z1 and Z2 in FIG. 3B represent the upper direction and the lower direction, respectively. However, these directions are defined in order to explain the shapes of elements (components, members, and parts) of the input device 10 and the relative positional relation among the elements. These directions are not intended to specify the attitude of the input device 10.

As depicted in FIG. 3A, a left held part 10L and a right held part 10R which are held in hands of a user are provided on the left side and the right side of the input device 10, respectively. The held parts 10L and 10R are separated from each other in the left-right direction. A device center part 10M is formed between front portions of the held parts 10L and 10R. The held parts 10L and 10R may have respective grips 10G that extend from the rear edge of the device center part 10M.

As depicted in FIG. 3A, a plurality of input members that are operated by fingers of a user are provided on a surface of the input device 10. More specifically, four input buttons 18 are disposed on the respective ends of a cross on an upper surface of the right held part 10R. In addition, a direction key (cross button) 19 having a cross-like shape is disposed on an upper surface of the front portion of the left held part 10L. In the input device 10, two input buttons 17a may be provided on the right side and the left side of an input member 20, which will be explained later, and further, an input button 17b may be provided on the device center part 10M. Further, as depicted in FIG. 3B, input buttons 15 and 16 (see FIG. 3B) may be provided on a front surface of each of the held parts 10R and 10L. The input buttons 15 and 16 are arranged side by side in the up-down direction.

The input device 10 may have input sticks 13. The input sticks 13 are disposed on a right portion and a left portion of the device center part 10M, for example. Each of the input sticks 13 can be tilted in a radial direction, and can be rotated about the initial center axis while being tilted. The input sticks 13 may be supported to be movable upwardly or downwardly and may function as buttons. The input sticks 13 may be slidable in a radial direction, instead of being tilted in a radial direction.

As depicted in FIGS. 3A and 3B, the input device 10 includes the input member 20 which has a plate-like shape, on an upper surface of the device center part 10M. The input member 20 is disposed forward of the left and right input sticks 13, for example. The input member 20 may include a touch sensor. The touch sensor outputs a signal according to the position of a finger that is in contact with a surface (upper surface) of the input member 20. For example, an electrostatic capacitance type sensor may be used as the touch sensor. In addition, the input member 20 may be supported to be movable upwardly or downwardly according to a depression operation performed by a user. In this case, the input device 10 includes a switch for detecting depression of the input member 20. The input member 20 may function as a button through which an on/off operation can be performed.

[Configuration of Input Member]

Figure 4:
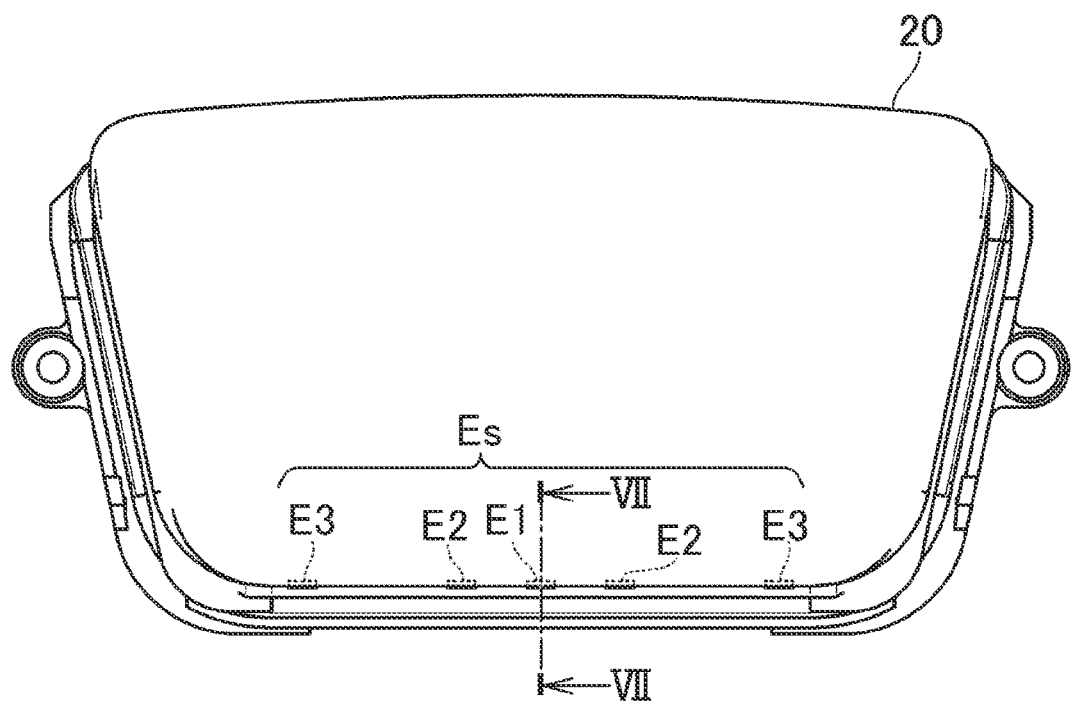
FIG. 4 is a plan view of one example of an input member.

FIG. 4 is a plan view of the input member 20. As depicted in FIG. 4, the input member 20 has a illumination region Es on its outer edge. The illumination region Es includes one first illumination part E1 and two second illumination parts E2. The one first illumination part E1 and the two second illumination parts E2 are placed at different positions. The first illumination part E1 is placed between the two second illumination parts E2. The illumination region Es further includes two third illumination parts E3. The two third illumination parts E3 are also placed at positions different from the positions of the first illumination part E1 and the two second illumination parts E2. The first illumination part E1 and the two second illumination parts E2 are placed between the two third illumination parts E3. In the following explanation, the first illumination part E1, the second illumination parts E2, and the third illumination parts E3 may simply be referred to as "illumination parts."

A plurality of (five in the present embodiment) illumination parts E1 to E3 are illuminated according to identification information allocated to the input device 10 by the information processing apparatus 11 (more specifically, the identification information allocation unit 82), in order to indicate the allocated identification information to a user. For example, the illumination parts E1 to E3 are illuminated according to the number that the identification information reception unit 91 has received as the identification information allocated to the input device 10. More specifically, the illumination part E1 to E3 are illuminated by light from respective light sources S1 to S3 (see FIG. 5), which will be explained later. When the first light source S1 is turned on, the first illumination part E1 is illuminated. When the first light source S1 is turned off, the first illumination part E1 is not illuminated. In addition, when the second light source S2 is turned on, the two second illumination parts E2 are illuminated. When the second light source S2 is turned off, the two second illumination parts E2 are not illuminated. Similarly, when the third light source S3 is turned on, the two third illumination parts E3 are illuminated. When the third light source S3 is turned off, the two third illumination parts E3 are not illuminated.

In the present embodiment, one or more of the illumination parts E1 to E3 are illuminated such that the number of illumination parts being illuminated corresponds to a number allocated to the input device 10 as the identification information. For example, in a case where a first number is allocated to the input device 10, one of the illumination parts E1 to E3 is illuminated. In a case where a second number is allocated to the input device, two of the illumination parts E1 to E3 are illuminated. In a case where a third number is allocated to the input device, three of the illumination parts E1 to E3 are illuminated. In a case where a fourth number is allocated to the input device, four of the illumination parts E1 to E3 are illuminated. Accordingly, by confirming the number of lights in the illumination region Es, the user recognizes which number is allocated to the input device 10.

Figure 5:
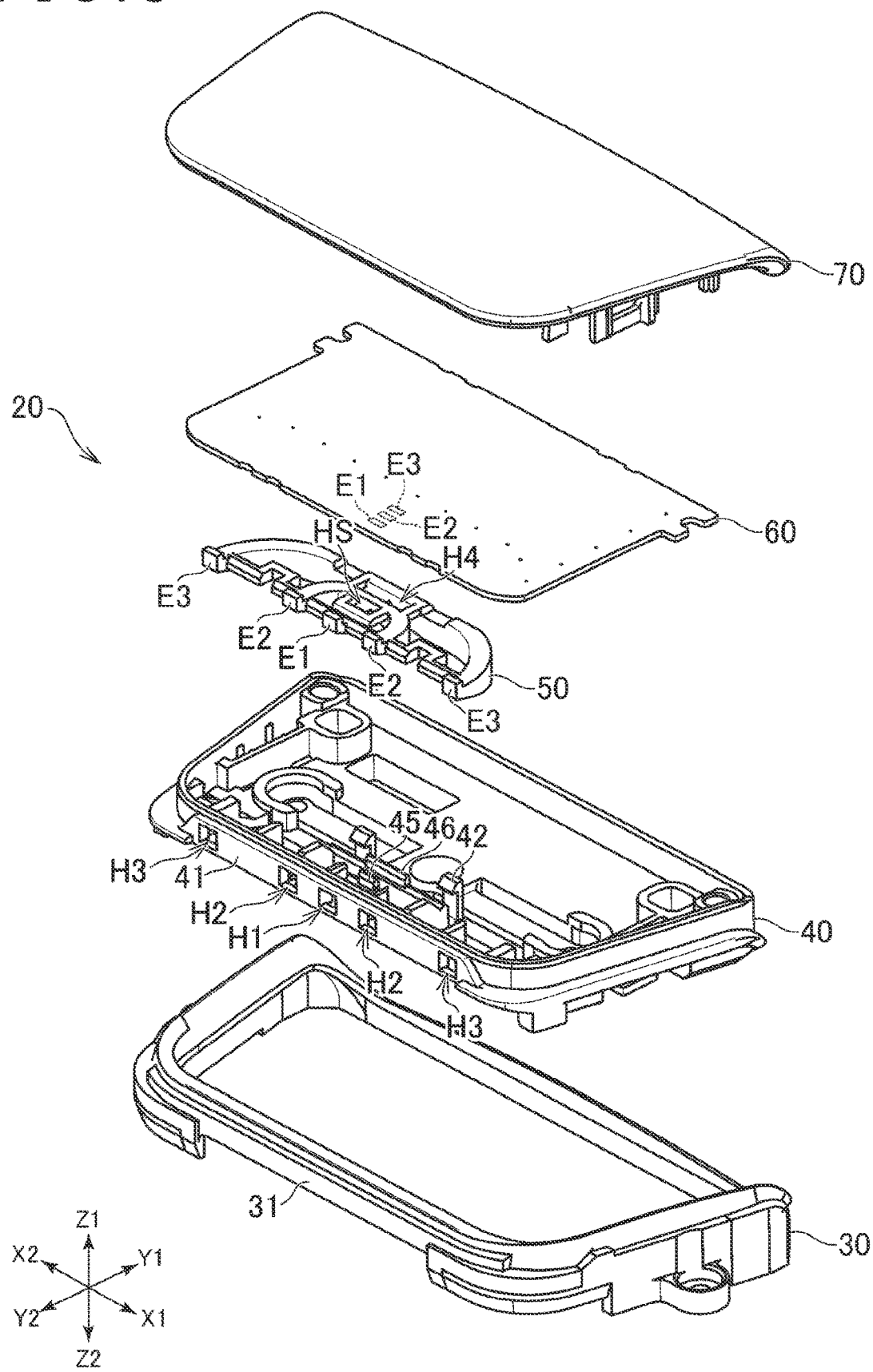
FIG. 5 is an exploded perspective view of one example of the input member.

FIG. 5 is an exploded perspective view of the input member 20. As depicted in FIG. 5, the input member 20 includes the light diffusion member 30 that has a frame-like shape, and a box-shaped frame 40 and a box-shaped cover member 70 that match with the shape of the light diffusion member 30. An inner space in the input member 20 which is defined by the light diffusion member 30, the frame 40, and the cover member 70 houses the circuit board 60 and a light guide member 50 that guides light emitted from a plurality of light sources S1 to S3, which will be explained later. The frame 40 has two claw parts 42 extending upwardly from the bottom of the frame 40. By being engaged with the light guide member 50, the two claw parts 42 fix the light guide member 50 thereto inside the input member 20. The circuit board 60 is attached to a lower surface of the cover member 70. The frame 40 and the cover member 70 may be made of resin, for example. At least a portion (particularly, a rear end edge 31) of the light diffusion member 30 includes a member that diffuses incident light. At least a portion (particularly, two wall parts 45 and 46, which will be explained later, or the like) of the frame 40 includes a non-translucent material.

As depicted in FIG. 5, the plurality of illumination parts E1 to E3 are defined on the rear end of the light guide member 50. In addition, one hole H1, two holes H2, and two holes H3 are formed in a rear end edge 41 of the frame 40. The hole H1, the two holes H2, and the two holes H3 are formed in the position corresponding to the first illumination part E1, in the positions corresponding to the two second illumination parts E2, and in the positions corresponding to the two third illumination parts E3, respectively. These five illumination parts E1 to E3 are exposed from these five holes H1 to H3, respectively, to the rear side of the frame 40. Light travelling from the illumination parts E1 to E3 enters the rear end edge 31 of the light diffusion member 30. Then, the intensity of the light becomes high in a region of the edge 31 overlapping with one or more of the illumination parts E1 to E3 that are illuminated. Accordingly, from the outside of the input member 20, the user can visibly confirm the number of the illumination parts being illuminated among the illumination parts E1 to E3.

As depicted in FIG. 5, these five illumination parts E1 to E3 are arranged in the left-right direction (a first direction) on the light guide member 50. As the plurality of illumination parts E1 to E3 are arranged in this way, the user can intuitively recognize the number of lights in the illumination region Es (i.e., a number allocated to the input device 10). Further, in the illumination region Es, the three illumination parts E1 and E2 are arranged at an equal interval in the left-right direction, while the four illumination parts E2 and E3 are arranged at an equal interval in the left-right direction. An effect that is provided by this arrangement will be explained later.

In addition, as depicted in FIG. 5, the first light source S1, the second light source S2, and the third light source S3, which are LEDs (light emitting diodes), for example, are attached to a lower surface of the circuit board 60. The first light source S1, the second light source S2, and the third light source S3 are arranged in this order in the front-rear direction (a second direction that is perpendicular to the first direction). In addition, the first light source S1 and the first illumination part E1 are arranged side by side in the front-rear direction. The first light source S1 is disposed forward of the first illumination part E1. The position of the second light source S2 in the left-right direction is between the two second illumination parts E2. Moreover, the second light source S2 is positioned separately forward of the first light source S1. The position of the third light source S3 in the left-right direction is between the two third illumination parts E3. The third light source S3 is positioned separately forward of the first light source S1 and the second light source S2. In the following explanation, the first light source S1, the second light source S2, and the third light source S3 may simply be referred to as "light sources."

A driving circuit for turning on/off the light sources S1 to S3 is mounted on the circuit board 60. The driving circuit turns on one or more of the light sources S1 to S3 and turns off the remaining light sources according to the number allocated to the input device 10. When the on/off states of the light sources S1 to S3 are switched, illuminated/non-illuminated states of the illumination parts E1 to E3 are accordingly switched. Controlling the light sources S1 to S3 will be explained in detail later.

In the present embodiment, the number of the illumination parts E1 to E3 is five, while the number of the light sources S1 to S3 is three. That is, the number of the light sources is less than the number of the illumination parts E1 to E3, which is five in this case. This is a result of the shape and the position of the light guide member 50 in the input member 20, which will be explained in detail hereinafter.

Figure 6A:
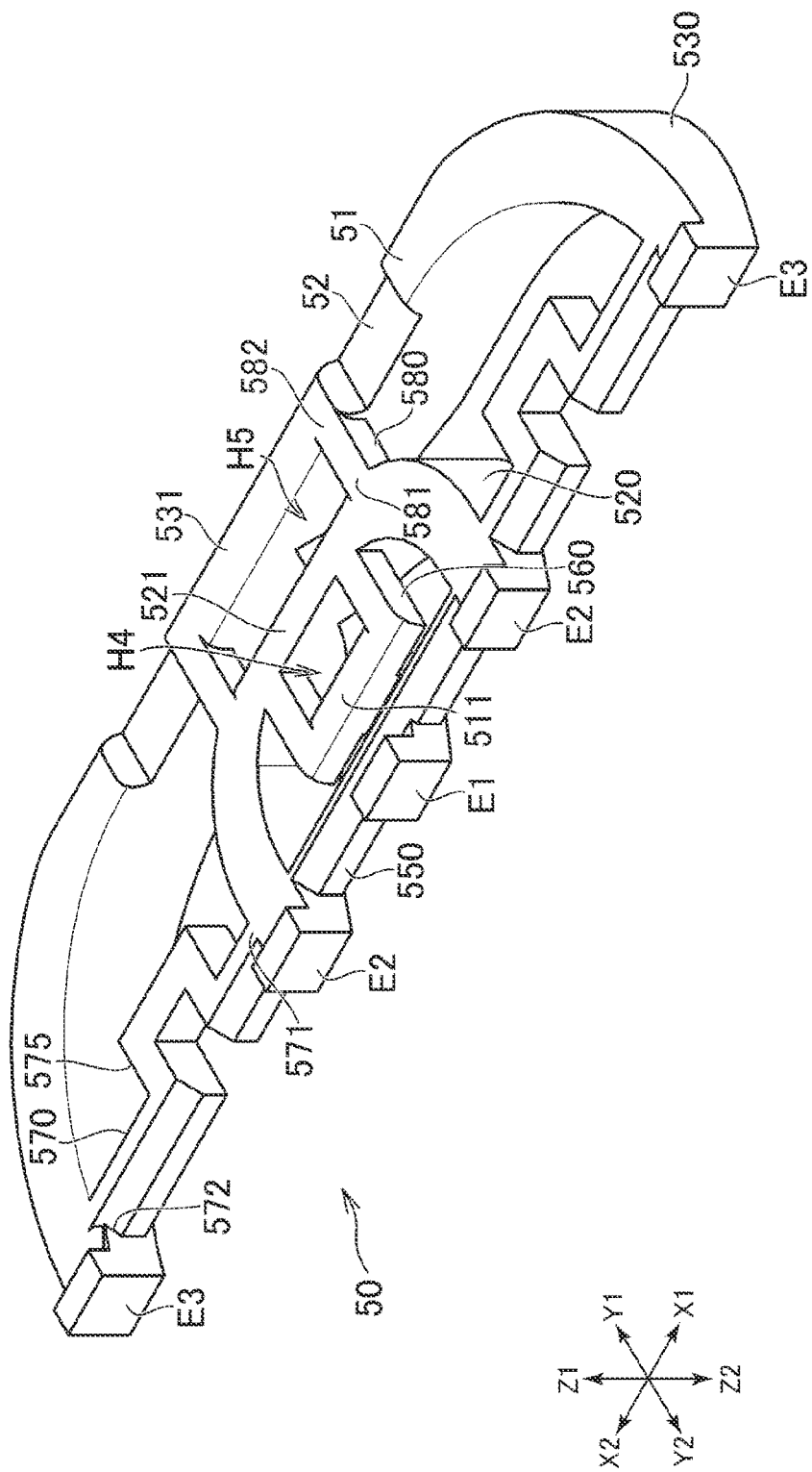
FIG. 6A is an exploded perspective view of one example of a light guide member.
Figure 7:
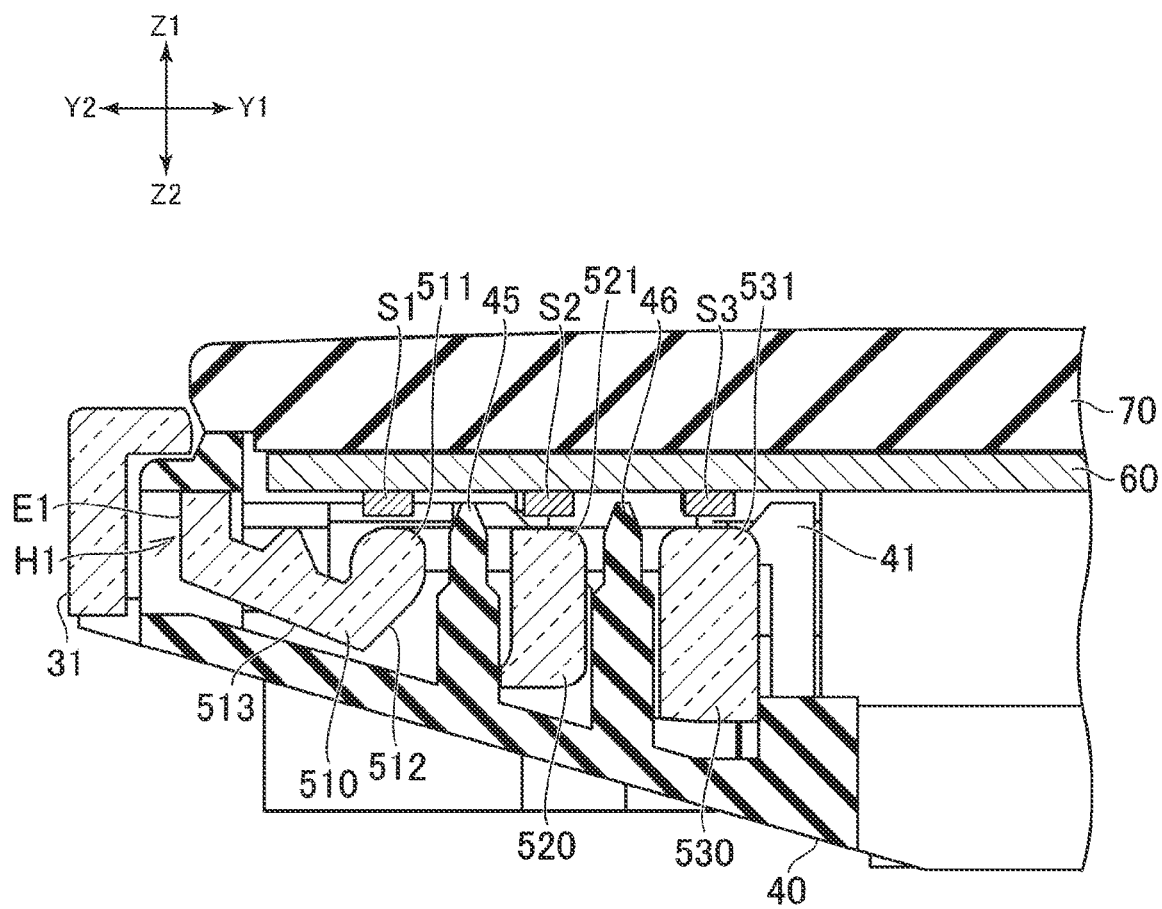
FIG. 7 is a cross-sectional view of the input member taken along a line VII-VII in FIG. 4.

[Shape and Position of Light Guide Member] FIGS. 6A and 6B are perspective views of the light guide member 50. FIG. 6A depicts an upper portion of the light guide member 50. FIG. 6B depicts a lower portion of the light guide member 50. FIG. 7 is a cross-sectional view of the input member 20 taken along line VII-VII in FIG. 4, and depicts a state where the light guide member 50 is attached to the inside of the input member 20.

The light guide member 50 is transparent or translucent, and is integrally formed of a resin or the like. As depicted in FIG. 6A, the light guide member 50 is formed by assembling a plurality of bar-like structures together. However, an upper surface 51 of the light guide member 50 is entirely formed into a flat shape. As depicted in FIGS. 5 and 7, the upper surface 51 of the light guide member 50 is facing the lower surface of the circuit board 60. Further, in the example in FIG. 6A, the illumination parts E1 to E3, which are defined on the light guide member 50, each have a shape projecting upwardly from the upper surface 51.

The light guide member 50 includes a first light guide part 510 that guides light emitted from the first light source S1 to the first illumination part E1, and a second light guide part 520 that guides light emitted from the second light source S2 to the two second illumination parts E2. The light guide member 50 further includes a third light guide part 530 that guides light emitted from the third light source S3 to the two third illumination parts E3. Accordingly, the illumination parts E1 to E3 are illuminated by light from the respective light sources S1 to S3. In the following explanation, the first light guide part 510, the second light guide part 520, and the third light guide part 530 may simply be referred to as "light guide parts."

In addition, the light guide member 50 includes bridge parts 550 and 560 connecting the first light guide part 510 and the second light guide part 520, and bridge parts 570 and 580 connecting the second light guide part 520 and the third light guide part 530. More specifically, the first light guide part 510 and the second light guide part 520 are connected to each other via the two bridge parts 550 extending in the left-right direction and the two bridge parts 560 extending in the front-rear direction. In addition, the second light guide part 520 and the third light guide part 530 are connected to each other via the two bridge parts 570 extending in the left-right direction on the left and right sides of the second light guide part 520 and the two bridge parts 580 extending in the front-rear direction. Accordingly, the light guide member 50 including the three light guide parts 510 to 530 is formed as a single member.

As depicted in FIG. 6B, below a second light reception portion 521 (see FIG. 6A), which will be explained later, that receives light from the second light source S2, the second light guide part 520 includes a branch portion 522 (first branch portion) that bifurcates to split the direction of light emitted from the second light source S2, into one side and the other side in the left-right direction, and two curved portions 523 (first curved portions) that are formed into arc shapes to guide the light split by the branch portion 522 toward the rear side. Since the second light guide part 520 includes the branch portion 522 and the two curved portions 523 as described above, the light emitted from the second light source S2 can be guided to the two second illumination parts E2 without being guided to the first light source S1 which is positioned rearward of the second light source S2. In addition, the number of light sources that are provided for the second illumination parts E2 can be reduced compared to a case where light sources are provided for the respective two second illumination parts E2, for example.

Also, below a third light reception portion 531 (see FIG. 6A), which will be explained later, that receives light emitted from the third light source S3, the third light guide part 530 includes a branch portion 532 (second branch portion) that bifurcates to split the direction of light emitted from the third light source S3, into one side and the other side in the left-right direction, and two curved portions 533 (second curved portions) that are formed into arc shapes to guide the light split by the branch portion 532 toward the rear side. Since the light emitted from the third light source S3 is split in this manner, the number of light sources can be reduced compared to a case where light sources are provided for the respective two third illumination parts E3, for example.

As depicted in FIG. 6A, the three light guide parts 510 to 530 include a first light reception portion 511 that receives light from the first light source S1, the second light reception portion 521 that receives light from the second light source S2, and the third light reception portion 531 that receives light from the third light source S3, respectively. The first light reception portion 511, the second light reception portion 521, and the third light reception portion 531 are arranged in this order in the front-rear direction similarly to the first light source S1, the second light source S2, and the third light source S3. The first light reception portion 511, the second light reception portion 521, and the third light reception portion 531 are facing the first light source S1, the second light source S2, and the third light source S3, respectively. In the present embodiment, the light guide member 50 has a symmetrical shape in the left-right direction. The first light reception portion 511, the second light reception portion 521, and the third light reception portion 531 are placed in the center of the light guide member 50 in the left-right direction. As engaged portions with which the claw parts 42 (see FIG. 5) for fixing the light guide member 50 are engaged, recesses S2 that are recessed downwardly from the upper surface 51 are formed on the left side and the right side of the third light reception portion 531. In the following explanation, the first light reception portion 511, the second light reception portion 521, and the third light reception portion 531 may simply be referred to as "light reception portions."

All the three light sources S1 to S3, which are disposed above the light reception portions 511 to 531, respectively, apply light to the lower side (one side in the third direction). Light sources (i.e., rear-light-emission-type light sources) that apply light to a side which is opposite to a side where the circuit board 60 is disposed can be adopted as the three light sources S1 to S3. Therefore, the production cost of the input device 10 can be reduced compared to a case where lateral-light-emission-type light sources are used.

As depicted in FIG. 7, the first light guide part 510 includes a reflection surface 512 (first reflection surface) on the lower side of the light reception portion 511. The reflection surface 512 slantingly reflects the light emitted from the first light source S1 toward the rear and upper side (the other side in the third direction). The first light guide part 510 further includes an extension portion 513 that is placed between the reflection surface 512 and the first illumination part E1 and that slantingly extends in a rear and upper direction toward the first illumination part E1. Since the first light guide part 510 has the reflection surface 512 and the extension portion 513 as described above, light applied downwardly from the first light source S1 can be guided to the first illumination part E1 which is positioned rearward of the first light source S1. Moreover, the light reception portion 511 has a rounded shape that has chamfered corners on the front and rear sides thereof. This can make it easier to concentrate light emitted from the first light source S1 on the reflection surface 512.

Further, as depicted in FIG. 6B, a reflection surface 522a (second reflection surface) that slantingly applies light emitted downwardly from the second light source S2 toward the upper left side and a reflection surface 522b (third reflection surface) that slantingly applies the light toward the upper right side are formed on the branch portion 522 that splits the light emitted from the second light source S2. A reflection surface 532a that slantingly applies light emitted downwardly from the third light source S3 toward the upper left side and a reflection surface 532b that applies the light to the upper right side are also formed on the branch portion 532 that splits the light emitted from the third light source S3. The thickness, in the up-down direction, of the curved portion 523 of the second light guide part 520 gradually decreases toward the second illumination part E2. The thickness, in the up-down direction, of the curved portion 533 of the third light guide part 530 also gradually decreases toward the third illumination part E3. Accordingly, the light emitted downwardly from the second light source S2 can be more efficiently guided to the two second illumination parts E2, and the light emitted downwardly from the third light source S3 can be more efficiently guided to the two third illumination parts E3. Further, similarly to the light reception portion 511, each of the light reception portions 521 and 523 may have a rounded shape that has chamfered corners on the front and rear sides thereof. This makes it easier to concentrate the light emitted from the second light source S2 on the reflection surfaces 522a and 522b and concentrate the light emitted from the third light source S3 on the reflection surfaces 532a and 532b.

As depicted in FIG. 7, a first wall part 45 that is disposed between the first light source S1 and the second light source S2 and a second wall part 46 that is disposed between the second light source S2 and the third light source S3 are provided inside the input member 20. The two wall parts 45 and 46 are not both transparent. In the present embodiment, the wall parts 45 and 46 are formed on the frame 40. The first wall part 45 extends upwardly from the bottom of the frame 40 and is disposed in a hole H4 (see FIG. 6A) that is defined by the first light guide part 510, the second light guide part 520, and the two bridge parts 560 of the light guide member 50. The second wall part 46 also extends upwardly form the bottom of the frame 40 and is disposed in a hole H5 (see FIG. 6A) that is defined by the second light guide part 520, the third light guide part 530, and the two bridge parts 580 of the light guide member 50. In this manner, the two non-transparent wall parts 45 and 46 are disposed between the light sources S1 to S3 and the light guide parts 510 to 530. Hence, in a case where any of the light sources (the first light source S1, for example) is turned on, light can be inhibited from traveling to the light guide part (the second light guide part 520, for example) that is disposed in a position different from the turned-on light source. Accordingly, the illumination part (e.g., the second illumination part E2) that does not correspond to the turned-on light source is inhibited from being illuminated.

It is to be noted that the two wall parts 45 and 46 are not necessarily formed on the frame 40. The two wall parts 45 and 46 may extend downwardly from the circuit board 60 or the cover member 70, for example. Alternatively, the two wall parts 45 and 46 may be provided on the light guide member 50. In this case, the light guide member 50 may be formed (colored) to have a non-translucent color with the two wall parts 45 and 46.

As previously explained, the second light guide part 520 and the third light guide part 530 are connected to each other via the bridge parts 570 and 580. Here, as depicted in FIG. 6A, the two bridge parts 570 that extend in the left-right direction each include a first connection portion 571 that is connected to the second light guide part 520 in a direction that substantially perpendicularly intersects with an extension direction (front-rear direction) in which a rear portion (a portion close to the second illumination part E2) of the second light guide part 520 extends, and a second connection portion 572 that is connected to the third light guide part 530 in a direction that substantially perpendicularly intersects with an extension direction (front-rear direction) in which a rear portion (a portion close to the third illumination part E3) of the third light guide part 530 extends. Since the bridge parts 570 is connected to the two light guide parts 520 and 530 in the direction that substantially perpendicularly intersects with the extension direction of the two light guide parts 520 and 530 in this manner, light is inhibited from being guided from the two light guide parts 520 and 530 to the bridge parts 570. That is, while the strength of the light guide member 50 is ensured with the bridge parts 570, one of the illumination parts (the second illumination part E2, for example) is illuminated, but another illumination part (the third illumination part E3, for example) is inhibited from being illuminated.

Further, similarly to the bridge parts 570, the two bridge parts 580 that extend in the front-rear direction each include a first connection portion 581 that is connected to the second light guide part 520 in a direction that substantially perpendicularly intersects with an extension direction (left-right direction) in which a front portion (a portion close to the second light reception portion 521) of the second light guide part 520 extends, and a second connection portion 582 that is connected to the third light guide part 530 in a direction that substantially perpendicularly intersects with an extension direction (left-right direction) in which a front portion (a portion close to the third light reception portion 531) of the third light guide part 530 extends. In addition, the bridge parts 550 and 560 connecting the first light guide part 510 and the second light guide part 520 to each other include a connection portion that is connected to the first light guide part 510 in a direction that substantially perpendicularly intersects with the extension direction of the first light guide part 510, and a connection portion that is connected to the second light guide part 520 in a direction that substantially perpendicularly intersects with the extension direction of the second light guide part 520.

The bridge part 570 has a bent portion 575 that is bent in the front-rear direction. Light having entered the bridge part 570 from the connection portions 571 and 572 is less likely to travel through the bent portion 575. Accordingly, with the bent portion 575 provided, it is possible to more efficiently prevent light from travelling from one of the light guide parts (the second light guide part 520, for example) to another light guide part (the third light guide part 530, for example).

[Light Emission Control] FIGS. 8 to 12 are diagrams each depicting a manner in which the illumination parts E1 to E3 are illuminated according to identification information allocated to the input device 10. In FIGS. 8 to 12, squares represent the illumination parts E1 to E3. Each black square represents a illumination part that is illuminated. Each square with a diagonal line represent a illumination part that is not illuminated.

Figure 8:
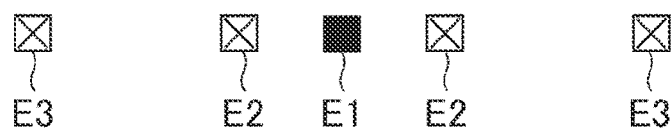
FIG. 8 is a diagram depicting a manner in which illumination parts are illuminated in a case where a first number is allocated to the input device.

FIG. 8 depicts a case where a first number (specifically, "1") is allocated to the input device 10. FIG. 8 depicts a case where a first number (specifically, "1") is allocated to the input device 10. As previously explained, the driving circuit that is mounted on the circuit board 60 turns on one or more of the first light source S1, the second light source S2, and the third light source S3 according to a number that is allocated to the input device 10. In a case where the first number is allocated to the input device 10, the driving circuit turns on the first light source S1 but turns off the second light source S2 and the third light source S3, as depicted in FIG. 8. As a result, only the first illumination part E1 is illuminated (lit), while the second illumination parts E2 and third illumination parts E3 are not illuminated. That is, the number of illumination parts being illuminated in the illumination region Es (see FIG. 4) is one, which matches with the first number allocated to the input device 10. Accordingly, the user can intuitively recognize that the first number is allocated to the input device 10.

Figure 9A:
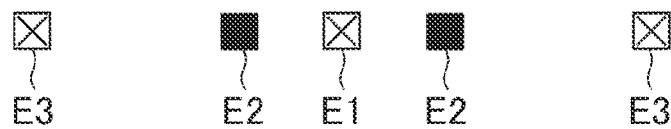
FIG. 9A is a diagram depicting a manner in which the illumination parts are illuminated in a case where a second number is allocated to the input device.
Figure 9B:
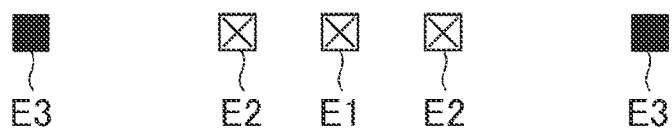
FIG. 9B is a diagram depicting a manner in which the illumination parts are illuminated in a case where a second number is allocated to the input device.

FIGS. 9A and 9B each depict a case where a second number (specifically, "2") is allocated to the input device 10. In a case where the second number is allocated to the input device 10, the driving circuit turns on the second light source S2 but turns off the first light source S1 and the third light source S3, as depicted in FIG. 9A. As a result, the two second illumination parts E2 are illuminated (lit), but the first illumination part E1 and the third illumination parts E3 are not illuminated. In this case, the number of illumination parts being illuminated is two, which matches with the second number allocated to the input device 10. Accordingly, the user can intuitively recognize that the second number is allocated to the input device 10.

It is to be noted that, in a case where the second number is allocated to the input device 10, the driving circuit may turn on the third light source S3 but turn off the first light source S1 and the second light source S2, as depicted in FIG. 9B. In this case, the third light source S3 corresponds to the "second light source" set forth in the claims, while the second light source S2 corresponds to the "third light source" set forth in the claims. As a result, the two third illumination parts E3 are illuminated (lit), but the first illumination part E1 and the second illumination parts E2 are not illuminated. Also in this case, the number of illumination parts being illuminated is two, which matches with the second number allocated to the input device 10. Accordingly, the user can intuitively recognize that the second number is allocated to the input device 10.

Figure 10A:
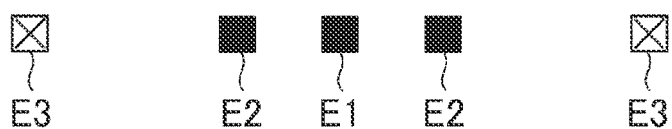
FIG. 10A is a diagram depicting a manner in which the illumination parts are illuminated in a case where a third number is allocated to the input device.
Figure 10B:
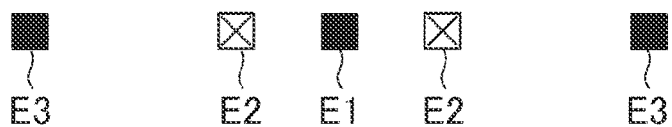
FIG. 10B is a diagram depicting a manner in which the illumination parts are illuminated in a case where a third number is allocated to the input device.

FIGS. 10A and 10B each depict a case where a third number (specifically, "3") is allocated to the input device 10. In a case where the third number is allocated to the input device 10, the driving circuit turns on the first light source S1 and one of the second light source S2 and the third light source S3 but turns off the other one of the second light source S2 and the third light source S3. In the example in FIG. 10(A), the second light source S2 and the first light source S1 are turned on, while the third light source S3 is turned off. As a result, the first illumination part E1 and the two second illumination parts E2 are illuminated (lit), while the third illumination parts E3 are not illuminated. In the example in FIG. 10(B), the third light source S3 and the first light source S1 are turned on, while the second light source S2 is turned off. As a result, the first illumination part E1 and the two third illumination parts E3 are illuminated (lit), while the second illumination parts E2 are not illuminated. In either case, the number of illumination parts being illuminated is three, which matches with the third number allocated to the input device 10. Accordingly, the user can intuitively recognize that the third number is allocated to the input device 10.

The first illumination part E1 and the two second illumination parts E2 are arranged at an equal interval. The first illumination part E1 and the three third illumination parts E3 are also arranged at an equal interval. Therefore, as depicted in FIG. 10(A) and FIG. 10(B), in a case where three of the illumination parts are illuminated, lights are positioned at an equal interval. Accordingly, a strange feeling which may be caused due to unequal intervals between the lights can be prevented from being given to the user.

Figure 11:
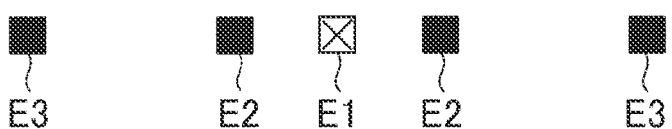
FIG. 11 is a diagram depicting a manner in which the illumination parts are illuminated in a case where a fourth number is allocated to the input device.

FIG. 11 depicts a case where a fourth number (specifically, "4") is allocated to the input device 10. In a case where the fourth number is allocated to the input device 10, the driving circuit turns on the second light source S2 and the third light source S3 but turns off the first light source S1. As a result, the two second illumination parts E2 and the two third illumination parts E3 are illuminated (lit), while the first illumination part E1 is not illuminated. In this case, the number of illumination parts being illuminated is four, which matches with the fourth number allocated to the input device 10. Accordingly, the user can intuitively recognize that the fourth number is allocated to the input device 10.

The four illumination parts E2 and E3 are arranged at an equal interval. Therefore, in a case where the four illumination parts E2 and E3 are illuminated, as depicted in FIG. 11, rays of the light are arranged at an equal interval. Accordingly, a strange feeling which may be caused due to unequal intervals between the lights can be prevented from being given to the user.

It should be noted that, in a case where a fifth number (specifically, "5") is allocated to the input device 10, which is not depicted in any of the drawings, the driving circuit may turn on all the light sources S1 to S3. In this case, the five illumination parts E1 to E3 are all illuminated (lit). Thus, the number of the illumination parts being illuminated matches with the fifth number allocated to the input device 10. Accordingly, the user can intuitively recognize that the fifth number is allocated to the input device 10.

As explained so far, the light guide member 50 according to the present disclosure guides light emitted from the second light source S2 toward the two second illumination parts E2 and guides light emitted from the third light source S3 toward the three third illumination parts E3. In this manner, the number of light sources that are provided in the input device 10 can be reduced compared to a case where light sources are provided for the respective five illumination parts E1 to E3, for example. In addition, since the number of illumination parts being illuminated among the illumination parts E1 to E3 matches with one of the first to the fifth numbers allocated to the input device 10, the user can intuitively recognize which number is allocated to the input device 10.

MODIFICATIONS

The present invention is not limited to the abovementioned input device 10, and various modifications may be made.

Figure 12:
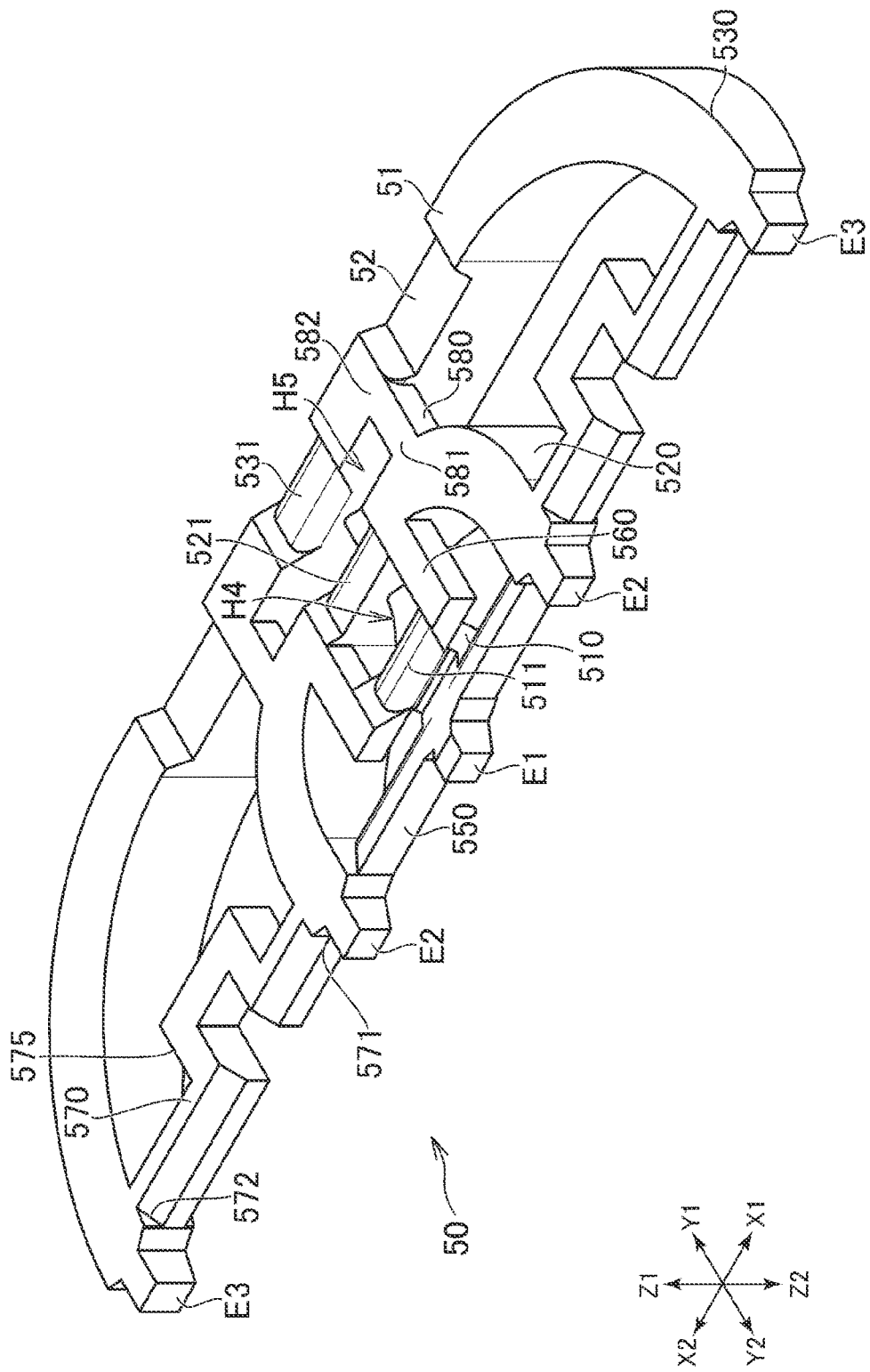
FIG. 12 is an exploded perspective view of another example of the light guide member.

FIG. 12 is a perspective view of another example of the light guide member 50. In the example in FIG. 12, the tops of three light reception portions 511 to 531 formed in the light guide member 50 are downwardly recessed from the upper surface 51 of the light guide member 50. With this, while the vertical size of the light sources S1 to S3 is maintained in order to increase the output of the light sources S1 to S3, the light reception portions 511 to 531 are prevented from coming into contact with the light sources S1 to S3, and the light guide member 50 is disposed closer to the circuit board 60. Therefore, a vertical space in the input member 20 can be reduced.

In the example in FIG. 12, upper surfaces of the illumination parts E1 to E3 defined on the light guide member 50 are flush with the general upper surface 51 of the light guide member 50. The width of each of the illumination parts E1 to E3 in the left-right direction is smaller than the width of each of the light guide parts 510 to 530 in the left-right direction. With this, a region of the light diffusion member 30 that is intensively illuminated when the illumination parts E1 to E3 are illuminated can be made small. This can avoid such a situation that the number of lights is unclear due to the blending of rays of light travelling from other illumination parts.

Figure 13:
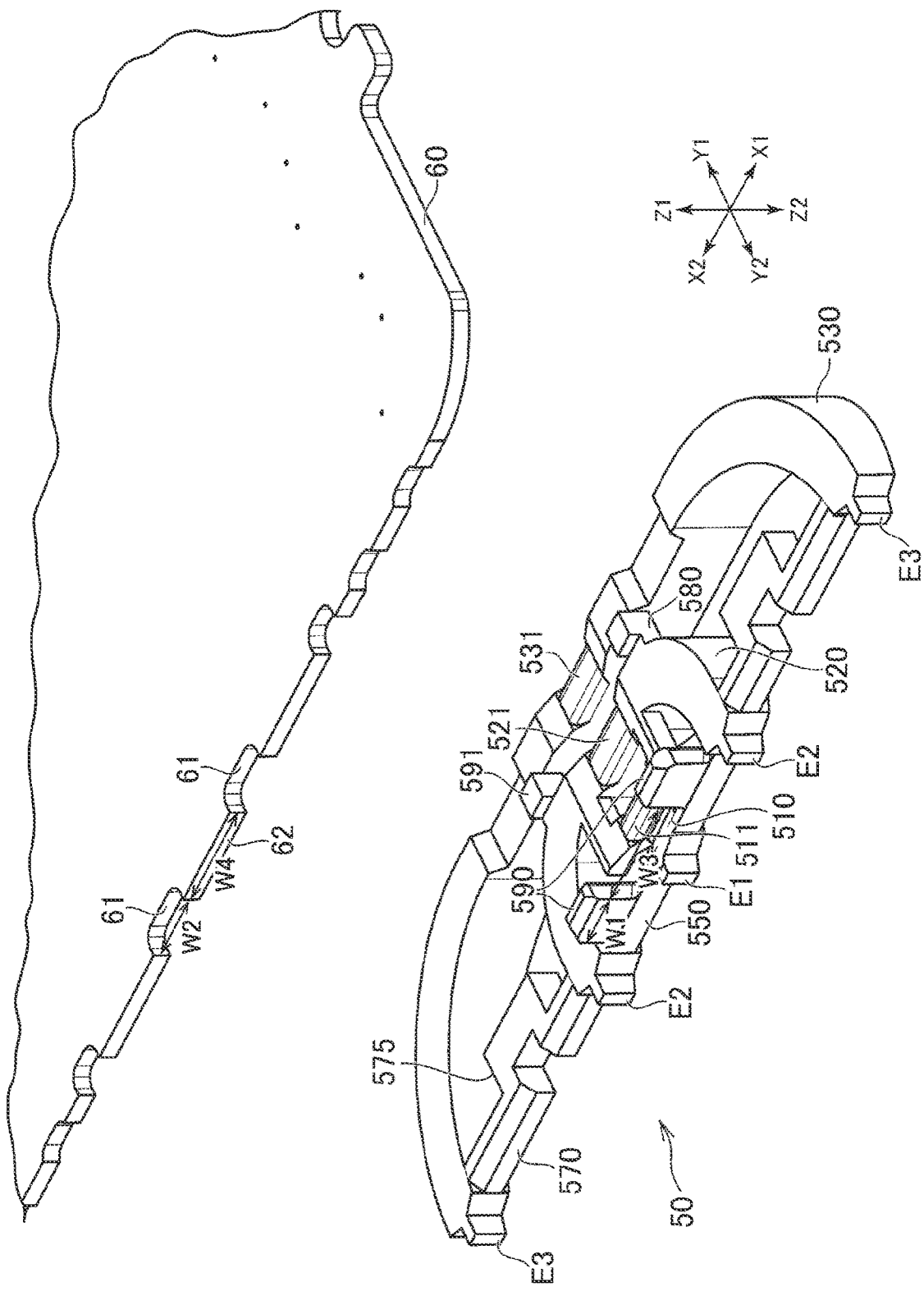
FIG. 13 is an exploded perspective view of another example of the light guide member and a circuit board.

FIG. 13 is a perspective view of another example of the light guide member 50 and the circuit board 60. In FIG. 13, as a structure for positioning the light guide member 50 with respect to the circuit board 60, the circuit board 60 has cuts 61 formed in the front end edge thereof, and the light guide member 50 has positioning ribs 590 formed thereon. Each of the positioning ribs 590 extends upwardly from the bridge part 550 connecting the first light guide part 510 and the second light guide part 520 to each other. The upper end of the positioning rib 590 is above an upper surface of a contact portion 591 (a portion that upwardly projects from the bridge part 580 connecting the second light guide part 520 and the third light guide part 530) with which the circuit board 60 is in contact.

A width W1 of each positioning rib 590 in the left-right direction is slightly smaller than a width W2 of each cut 61 in the left-right direction. In addition, a distance W3 between the two positioning ribs 590 is slightly longer than a distance W4 between the two cuts 61. In a state where the light guide member 50 is disposed directly below the circuit board 60 and where the positioning ribs 590 are disposed on the inner side of the respective cuts 61, at least one of the left and right edges of each of the positioning ribs 590 may be in contact with an edge of the corresponding cut 61. In addition, in a state where a projection 62 that is defined by the two cuts 61 in the circuit board 60 is disposed between the two positioning ribs 590, at least one of the left and right edges of the projection 62 may be in contact with edges of the two positioning ribs 590. With this, movement of the light guide member 50 in the left-right direction is restricted, so that the light guide member 50 can be positioned relative to the circuit board 60.

In FIG. 13, both the two positioning ribs 590 are formed on the bridge parts 550, but are not formed on the light guide parts 510 to 530. That is, no positioning rib 590 is formed on any paths that extend from the light sources S1 to S3 (the light reception portions 511 to 531) to the illumination parts E1 to E3. In addition, the positioning ribs 590 are formed on the bridge parts 550, which are closer to the light sources S1 to S3 than the bridge parts 570 are. Accordingly, positional displacement of the light sources S1 to S3 from the light guide parts 510 to 530 which are paths of light emitted from the light sources S1 to S3 can be suppressed. The difference in brightness can be suppressed among light outputted from the illumination part E1 after travelling along the first light guide part 510, light outputted from the illumination parts E2 after travelling along the second light guide part 520, and light outputted from the illumination parts E3 after travelling along the third light guide part 530.

It should be noted that, in the example in FIG. 13, the number of the positioning ribs 590 is two, and the number of the cuts 61 is two. However, the number of the positioning ribs 590 and the number of the cuts 61 may be one, or may be three or more. In addition, in a case where two or more positioning ribs 590 and two or more cuts 61 are formed, the width W1 of the positioning ribs 590 may be constant or be varied. In this case, the width W2 of the cuts 61, which corresponds to the width W1 of the positioning ribs 590, may also be constant or be varied. Further, in a case where three or more positioning ribs 590 and three or more cuts 61 are provided, the width W3 between two adjacent positioning ribs 590 may also be constant or be varied. In this case, the width W4 between two adjacent cuts 61 may also be constant or be varied. In a case where two or more positioning ribs 590 and two or more cuts 61 are provided, it is sufficient that the distance between the right edge of the leftmost positioning rib 590 and the left edge of the rightmost positioning rib 590 is slightly longer than the distance between the right edge of the leftmost cut 61 and the left edge of the rightmost cut 61. Accordingly, movement of the light guide member 50 in the left-right direction is restricted, so that the light guide member 50 can be positioned relative to the circuit board 60.

Further, the case where the first light guide part 510 is formed in the light guide member 50 has been explained in the embodiment. However, the light guide member 50 may include no first light guide part 510, and the first light source S1 may be provided forward of the hole H1, which is depicted in FIG. 5, not via the light guide member 50.

Further, the case where any one of the first to fifth numbers is allocated to the input device 10 has been explained in the embodiment. Alternately, only the first to third numbers may be allocated to the input device 10. In this case, only two light sources, i.e., the first light source S1 and the second light source S2, may be provided in the input device 10, and the light guide member 50 may not include the two third illumination parts E3 and the third light guide part 530.

In this example, the driving circuit that is mounted on the circuit board 60 controls the on/off states of the first light source S1 and the second light source S2 according to identification information that indicates that the first number is allocated to the input device 10. More specifically, in a case where the first number is allocated to the input device 10, the first light source S1 is turned on while the second light source S2 is turned off. As a result, only the first illumination part E1 is illuminated (lit). The number of illumination parts being illuminated in the illumination region Es (see FIG. 4) is one, which matches with the first number allocated to the input device 10. Alternatively, in a case where the second number is allocated to the input device, the driving circuit turns on the second light source S2 but turns off the first light source S1. As a result, the two second illumination parts E2 are illuminated (lit). The number of illumination parts being illuminated matches with the second number allocated to the input device 10. Alternatively, in a case where the third number is allocated to the input device 10, the driving circuit turns on both the first light source S1 and the second light source S2. As a result, all the three illumination parts E1 and E2 are illuminated (lit). The number of illumination parts being illuminated matches with the third number allocated to the input device 10.

Also in the above cases, two light sources are sufficient to illuminate the three illumination parts E1 and E2. The number of the light sources can be reduced compared to a case where three light sources are provided for the respective three illumination parts E1 and E2, for example. In addition, one or more of the three illumination parts E1 and E2 are illuminated such that the number of illumination parts being illuminated corresponds to one of the first to third numbers that is allocated to the input devices 10. Accordingly, the user can intuitively recognize which number is allocated to the input device 10.

The invention claimed is:

1. An input device to which unique identification information is allocated, the input device comprising:
    a first light source;
    a second light source;
    a first illumination part that is illuminated by light from the first light source in order to indicate the identification information;
    two second illumination parts that are placed at positions different from a position of the first illumination part and that are illuminated by light from the second light source in order to indicate the identification information; and
    a light guide member including a second light guide part that guides the light from the second light source to the two second illumination parts.

2. The input device according to claim 1, further comprising: a driving circuit that turns on one of or both the first light source and the second light source in such a manner that one of or both the first illumination part and the two second illumination parts are illuminated according to the identification information.

3. The input device according to claim 1, wherein the identification information is allocated by an information processing apparatus with which the input device is connected.

4. The input device according to claim 2, wherein
    at least any one of a first number, a second number, and a third number is allocated to the input device as the identification information, and
    the driving circuit turns on one of or both the first light source and the second light source in such a manner that the number of the illumination parts being illuminated among the first illumination part and the second illumination parts corresponds to the number allocated to the input device.

5. The input device according to claim 4, wherein
    the driving circuit
    turns on the first light source but turns off the second light source in a case where the first number is allocated to the input device,
    turns on the second light source but turns off the first light source in a case where the second number is allocated to the input device, and
    turns on the first light source and the second light source in a case where the third number is allocated to the input device.

6. The input device according to claim 1, wherein
    the first illumination part is placed between the two second illumination parts, and
    the first illumination part and the two second illumination parts are arranged in a first direction.

7. The input device according to claim 6, wherein the first light source and the second light source are arranged in a second direction that is perpendicular to the first direction.

8. The input device according to claim 7, further comprising: a wall part that is disposed between the first light source and the second light source.

9. The input device according to claim 7, wherein
the second light source is separated from the first light source in the second direction, and
the light guide member includes
a first branch portion that bifurcates to split a direction of the light from the second light source to one side and another side in the first direction, and
two first curved portions that guide rays of the split light in the second direction.

10. The input device according to claim 9, wherein
the second light source applies light to one side in a third direction that is perpendicular to the first direction and the second direction, and
the first branch portion includes a second reflection surface by which the light applied from the second light source to the one side in the third direction is slantingly reflected toward the one side in the first direction and another side in the third direction, and a third reflection surface by which the light applied from the second light source to the one side in the third direction is slantingly reflected toward the other side in the first direction and the other side in the third direction.

11. The input device according to claim 6, wherein
the first light source and the first illumination part are arranged in a second direction that is perpendicular to the first direction,
the first light source applies light to one side in a third direction that is perpendicular to the first direction and the second direction,
the light guide member includes a first light guide part that guides the light from the first light source to the first illumination part, and
the first light guide part includes a first reflection surface by which the light from the first light source is slantingly reflected toward one side in the second direction and another side in the third direction.

12. The input device according to claim 11, wherein
the first light guide part further includes an extension portion that extends from the first reflection surface toward the first illumination part in a slanting direction to the one side in the second direction and the other side in the third direction.

13. The input device according to claim 2, further comprising:
a third light source; and
two third illumination parts that are placed at positions different from the positions of the first illumination part and the two second illumination parts and that are illuminated by light from the third light source, wherein
the light guide member further includes a third light guide part that guides the light from the third light source to the two third illumination parts, and
the driving circuit turns on one of or both the first light source and the second light source in such a manner that one or more of the first illumination part, the two second illumination parts, and the two third illumination parts are illuminated according to the identification information allocated to the input device.

14. The input device according to claim 13, wherein
at least any one of a first number, a second number, a third number, and a fourth number is allocated to the input device as the identification information, and
the driving circuit turns on one or more of the first light source, the second light source, and the third light source in such a manner that the number of the illumination parts being illuminated among the first illumination part, the two second illumination parts, and the two third illumination parts corresponds to the number allocated to the input device.

15. The input device according to claim 13, wherein
the first illumination part is placed between the two second illumination parts,
the first illumination part and the two second illumination parts are placed between the two third illumination parts, and
the first illumination part, the two second illumination parts, and the two third illumination parts are arranged in a first direction.

16. The input device according to claim 15, wherein the first light source, the second light source, and the third light source are arranged in this order in a second direction that is perpendicular to the first direction.

17. The input device according to claim 13, wherein
the light guide member further includes
a bridge part connecting the second light guide part and the third light guide part,
the bridge part includes a first connection portion that is connected to the second light guide part in a direction intersecting with a direction in which the second light guide part extends, and a second connection portion that is connected to the third light guide part in a direction intersecting with a direction in which the third light guide part extends.

18. A control system comprising:
an input device; and
a controller that allocates unique identification information to the input device, wherein
the input device includes
a first light source,
a second light source,
a first illumination part that is illuminated by light from the first light source in order to indicate the identification information,
two second illumination parts that are placed at positions different from a position of the first illumination part and that are illuminated by light from the second light source in order to indicate the identification information, and
a light guide member including a second light guide part that guides the light from the second light source to the two second illumination parts, and
the controller turns on one of or both the first light source and the second light source in such a manner that one of or both the first illumination part and the two second illumination parts are illuminated according to the identification information allocated to the input device.

* * * * *